United States Patent
Ueno et al.

(10) Patent No.: US 12,286,188 B2
(45) Date of Patent: Apr. 29, 2025

(54) SADDLE RIDING VEHICLE

(71) Applicant: KAWASAKI MOTORS, LTD., Hyogo (JP)

(72) Inventors: Shusei Ueno, Hyogo (JP); Shinji Ikeda, Hyogo (JP); Mitsuru Kobayashi, Hyogo (JP); Tomoya Sugiyama, Hyogo (JP); Takumi Uemoto, Hyogo (JP); Masaya Ohta, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 303 days.

(21) Appl. No.: 17/954,579

(22) Filed: Sep. 28, 2022

(65) Prior Publication Data

US 2023/0109484 A1   Apr. 6, 2023

(30) Foreign Application Priority Data

Oct. 1, 2021 (JP) .................................. 2021-163079
Aug. 5, 2022 (JP) .................................. 2022-125438

(51) Int. Cl.
*B62J 50/30* (2020.01)
*B62J 43/16* (2020.01)
*B62M 7/02* (2006.01)
*H01M 10/6562* (2014.01)
*H01M 50/271* (2021.01)

(52) U.S. Cl.
CPC ............... *B62J 50/30* (2020.02); *B62J 43/16* (2020.02); *B62M 7/02* (2013.01); *H01M 10/6562* (2015.04); *H01M 50/271* (2021.01); *H01M 2220/20* (2013.01)

(58) Field of Classification Search
CPC . B62J 50/30; B62J 43/16; B62J 43/10; B62M 7/02; H01M 10/6562; H01M 50/271
See application file for complete search history.

(56) References Cited

U.S. PATENT DOCUMENTS

| | | | |
|---|---|---|---|
| 9,296,444 B2 * | 3/2016 | Matsuda | B62J 43/28 |
| 9,677,516 B2 * | 6/2017 | Naruoka | F02M 35/14 |
| 11,124,260 B2 * | 9/2021 | Iwata | B62K 11/04 |
| 11,820,454 B2 * | 11/2023 | Fujikubo | B62J 11/16 |
| 2020/0385079 A1 * | 12/2020 | Ueno | B62M 7/02 |
| 2021/0001947 A1 | 1/2021 | Fujikubo et al. | |

FOREIGN PATENT DOCUMENTS

| | | | | |
|---|---|---|---|---|
| CN | 212164070 U | * | 12/2020 | |
| EP | 3715235 A1 | * | 9/2020 | ............. B60L 50/66 |
| JP | 2016046852 A | * | 4/2016 | ............. B60L 50/72 |
| WO | WO-2019065390 A1 | * | 4/2019 | ............. B60K 6/40 |
| WO | 2019/186946 | | 10/2019 | |

* cited by examiner

Primary Examiner — John D Walters
(74) Attorney, Agent, or Firm — GREENBLUM & BERNSTEIN, P.L.C.

(57) ABSTRACT

A saddle riding vehicle includes: a motor which is a driving power source; a battery which powers the motor; a duct which supplies incoming wind to the battery; and a rear fender which is disposed above a rear wheel and houses the battery. The rear fender includes, behind the battery, a discharge hole which discharges the incoming wind supplied by the duct.

10 Claims, 10 Drawing Sheets

SADDLE RIDING VEHICLE

CROSS REFERENCE TO THE RELATED APPLICATION

This application is based on and claims Convention priority to Japanese patent application No. 2021-163079, filed Oct. 1, 2021 and Japanese patent application No. 2022-125438, filed Aug. 5, 2022, the entire disclosures of all of which are herein incorporated by reference as a part of this application.

BACKGROUND OF THE INVENTION

Field of the Invention

The present application relates to a saddle riding vehicle including a motor which is a driving power source and a battery which powers the motor.

Description of Related Art

Some saddle riding vehicles such as motorcycles include a motor which is a driving power source of the vehicle and a battery which powers the motor (for example, WO 2019/186946 A1). Since such a battery generates heat in itself, it is necessary to cool the battery to maintain its performance. Cooling of a battery is often performed by air cooling using incoming wind.

Saddle riding vehicles such as motorcycles, however, have a limited installation space. Therefore, in some cases, a battery is disposed at the rear of the vehicle body considering arrangement and installation of other components. In such cases, a configuration which helps more incoming wind to flow to the battery is desired.

SUMMARY OF THE INVENTION

The disclosure of the present application provides a saddle riding vehicle whose battery can be effectively cooled.

In one embodiment of the present disclosure, a saddle riding vehicle includes: a motor which is a driving power source; a battery which powers the motor; a duct which supplies incoming wind to the battery; and a battery case which is disposed above a rear wheel and houses the battery, in which the battery case includes a discharge hole therein which is defined in the battery case or rearward of the battery case and discharges the incoming wind supplied by the duct.

According to the saddle riding vehicle of the present disclosure, the incoming wind flows in the duct and is then supplied to the battery inside of the battery case. The incoming wind supplied to the battery is used to cool the battery and is, then discharged from the discharge holes behind the battery. This makes it possible to effectively cool the battery disposed in the rear part of the vehicle body by the incoming wind.

The present disclosure encompasses any combination of at least two features disclosed in the claims and/or the specification and/or the drawings. In particular, any combination of two or more of the appended claims should be equally construed as included within the scope of the present disclosure.

BRIEF DESCRIPTION OF THE DRAWINGS

The present disclosure will be more clearly understood from the following description of preferred embodiments thereof, when taken in conjunction with the accompanying drawings. However, the embodiments and the drawings are given only for the purpose of illustration and explanation, and are not to be taken as limiting the scope of the present disclosure in any way whatsoever, which scope is to be determined by the appended claims. In the accompanying drawings, like reference numerals are used to denote like or corresponding parts throughout the several views:

DESCRIPTION OF THE EMBODIMENTS

Figure 1:
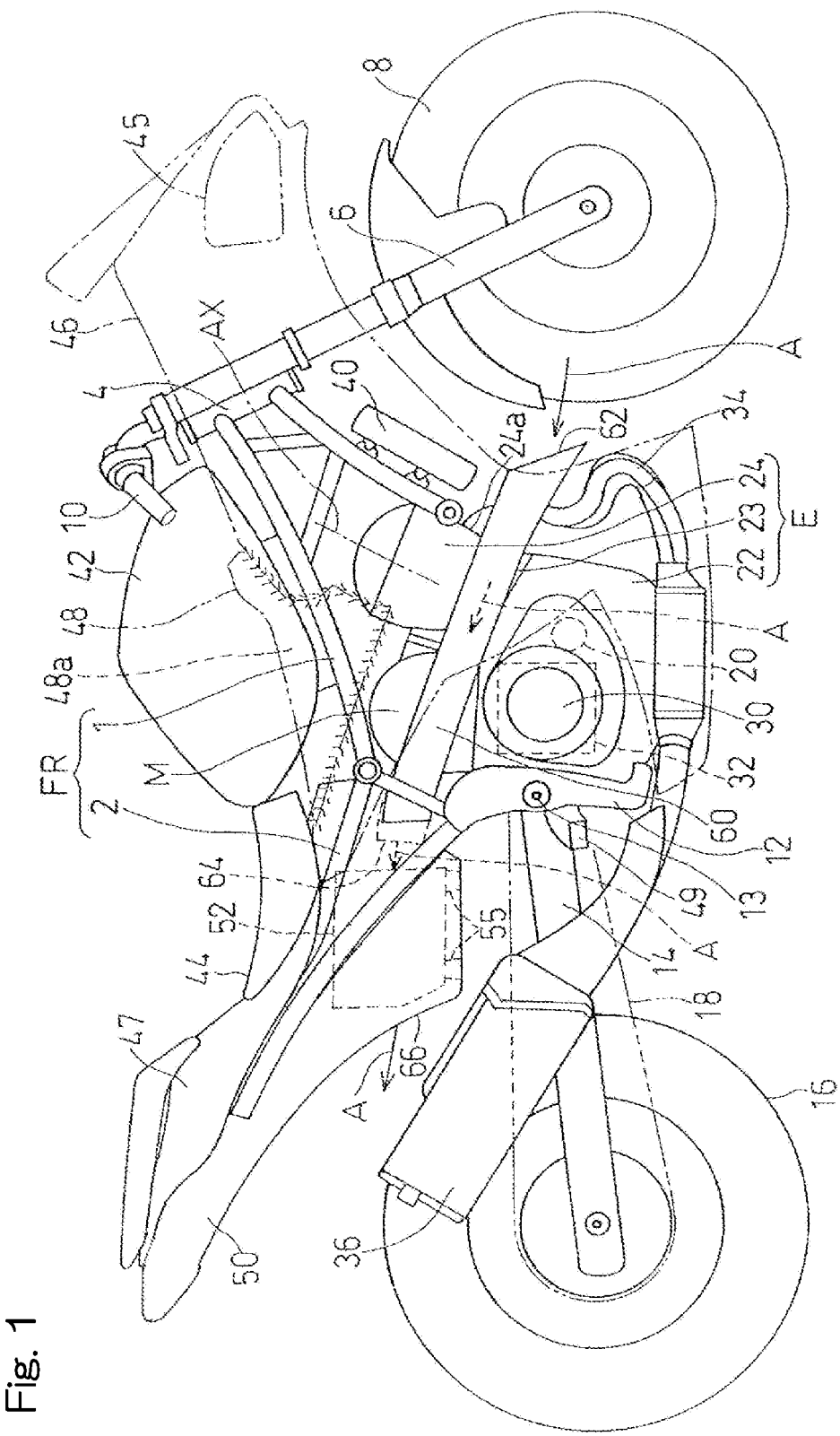
FIG. 1 is a side view showing a motorcycle that is a type of saddle riding vehicle according to a first embodiment of the present disclosure.

Hereinafter, a preferable embodiment of the present disclosure will be described with reference to the drawings. FIG. 1 is a side view showing a front part of a motorcycle that is a type of saddle riding vehicle according to a first embodiment of the present disclosure. As used herein, the "left" and "right" correspond to the "left" and "right" when viewed by a driver riding on the vehicle, respectively. The "front" and "rear" correspond to the "front" and "rear" in the moving direction of the vehicle.

The motorcycle of the present embodiment is a hybrid vehicle including an engine E which is a first driving power source, and a driving motor M which is a second driving power source. That is, depending on the driving condition, the motorcycle of the present embodiment drives using only the engine E that is an internal combustion engine, or using only the motor M that is an electric motor, or using both the engine F and the motor M simultaneously.

The motorcycle includes a vehicle body frame FR including a main frame 1 which constitutes the front half and a rear frame 2 which constitutes the rear half. The main frame 1 extends rearward and diagonally downward from a head pipe 4 at the front end and then is bent downward to extend in the vertical direction. The rear frame 2 extends rearward from the main frame 1.

The head pipe 4 supports a front fork 6. A front wheel 8 is supported by a lower end portion of the front fork 6, and a handlebar 10 is attached to an upper end portion of the front fork 6.

A swing arm bracket 12 is provided to a rear end portion of the main frame 1. The swing arm bracket 12 supports swing arms 14 in such a way that the swing arms 14 are allowed to vertically swing about a pivot shaft 13. A rear wheel 16 is attached to rear end portions of the swing arms 14.

The engine E is disposed in a lower part of the main frame 1 between the front wheel 8 and the rear wheel 16 and is supported by the vehicle body frame FR. Power of the engine E is transmitted to the rear wheel 16 through a power transmission member 18, so that the rear wheel 16 is driven. The power transmission member 18 is, for example, a drive chain. However, the power transmission member 18 is not limited to a drive chain.

The engine E includes a crankshaft 20 extending in the vehicle widthwise direction, a crankcase 22 supporting the crankshaft 20 in a rotatable manner, a cylinder 23 protruding upward from the crankcase 22, and a cylinder head 24 located above the cylinder. In the present embodiment, the axis AX of the cylinder 23 is inclined frontward as it extends upward. The motor M is disposed above the crankcase 22.

The motor M is disposed behind the cylinder 23. The motor M is disposed on the inner side with respect to the outer ends of the cylinder 23 in the vehicle widthwise direction. Specifically, the right end face of the motor M is disposed on the inner side with respect to the right end face of the cylinder 23 in the vehicle widthwise direction. Power of the motor M is transmitted to an input shaft located on the downstream side of the clutch, so that the power of the motor M is transmitted as a motion driving force. When the clutch is disconnected, the vehicle can drive using the motor M only. When the clutch is connected, the vehicle can drive using both the motor M and the engine E. When the clutch is connected and the motor power is stopped, the vehicle can drive using the engine E.

Figure 2:
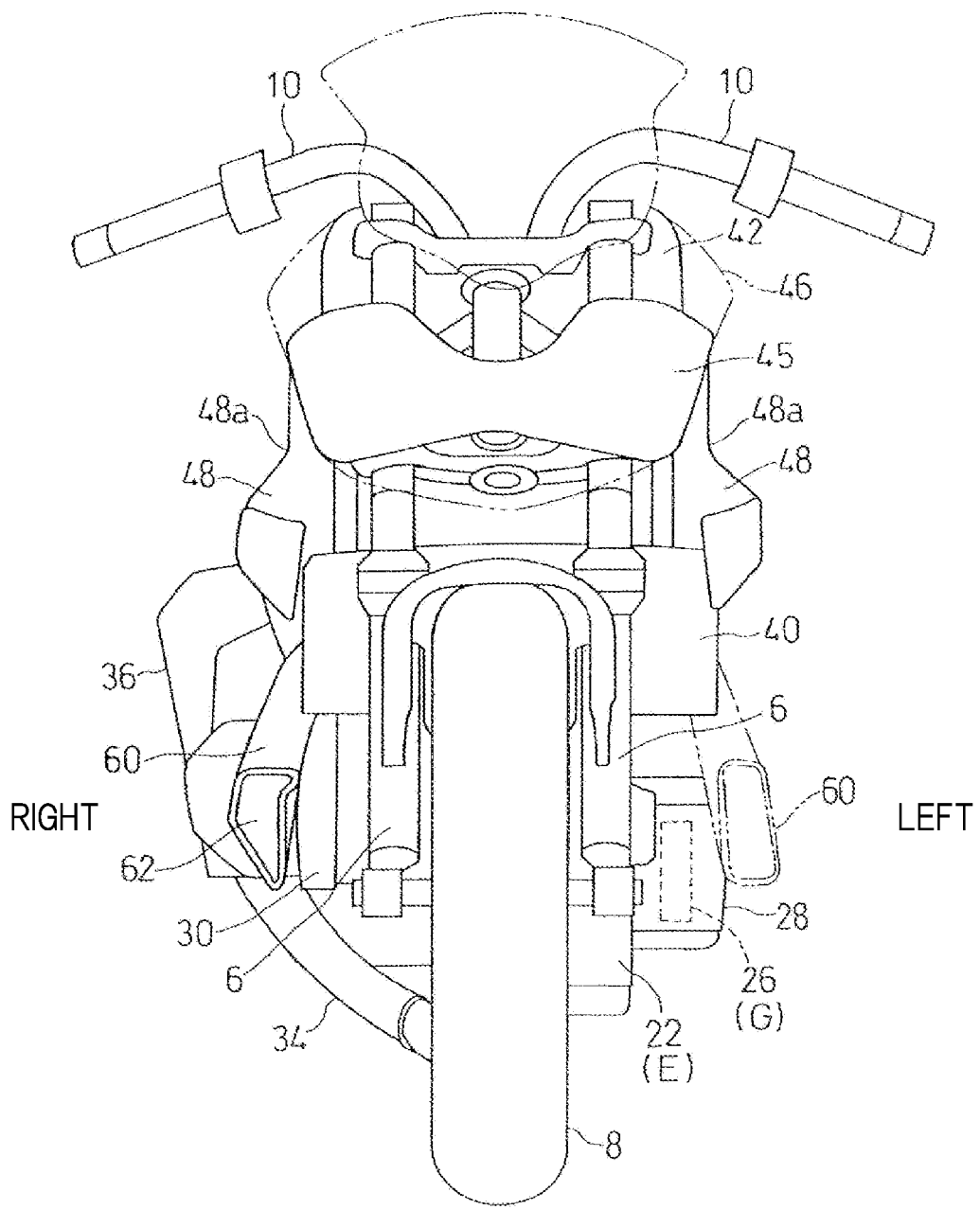
FIG. 2 is a front view of the motorcycle.

A generator 26 shown in FIG. 2 is disposed on one side or at one axial end of the crankshaft 20. In the present embodiment, a generator 26 is disposed on the left side of the crankshaft 20. The generator 26 generates electrical power from the power of the engine E, i.e., from rotation of the crankshaft 20. A generator cover 28 is removably attached to the left side surface of the crankcase 22. The generator cover 28 covers the generator 26 and the crankshaft 20 from the outer side in the vehicle widthwise direction. That is, the generator cover 28 constitutes a cover body which is attached to the crankcase 22 and covers an end face of the crankshaft 20 from the vehicle widthwise direction.

The clutch cover 30 is removably attached to the right side surface of the crankcase 22 shown in FIG. 1. The clutch cover 30 covers the crankshaft 20 and the clutch 32 connected to the crankshaft 20 from the outer side in the vehicle widthwise direction. That is, the clutch cover 30 constitutes a cover body which is attached to the crankcase 22 and covers an end face of the crankshaft 20 from the vehicle widthwise direction.

An exhaust pipe 34 is connected to an exhaust port 24a on the front face of the cylinder head 24. The exhaust pipe 34 extends rearward below the engine E to be connected to an exhaust muffler 36 on the right side of the rear wheel 16. The exhaust muffler 36 reduces the noise of exhaust from the exhaust pipe 34 before it is discharged outside.

A radiator 40 is disposed above and in front of the engine E. The radiator 40 uses incoming wind to cool the cooling water for the engine E. In the present embodiment, the radiator 40 is disposed, in a side view, substantially parallel to the axis AX of the cylinder 23 with the lower half of the radiator 40 located forward of the cylinder head 24 and the upper half of the radiator 40 located above and forward of the cylinder head 24.

A fuel tank 42 is disposed in an upper part of the main frame 1, and a seat 44 on which a driver sits is attached to the rear frame 2. The fuel tank 42 is disposed right above the engine E, behind the head pipe 4 and in front of the seat 44.

A cowling 46 made of a resin, which is illustrated with double dotted lines, is disposed on the front half of the vehicle body. The cowling 46 of the present embodiment covers an area in front of the head pipe 4 to an area lateral to the engine E. A headlight 45 is attached to the cowling 46. A pair of left and right rear cowls 47 made of a resin are disposed at the rear of the cowling 46. The rear cowls 47, which are illustrated with solid lines, cover the gaps between the seat 44 and the rear frame 2 from the outer lateral sides.

A pair of left and right knee grip parts 48, which are illustrated with double dotted lines, are arranged below the fuel tank 42. In the present embodiment, the knee grip parts 48 are realized as knee grip covers. The knee grip covers 48 cover areas located forward of and below the seat 44 from outer lateral sides. As shown in FIG. 2, each of the knee grip covers 48 includes a recessed part 48a which is recessed inward in the vehicle widthwise direction with respect to the rest of that knee grip cover 48. The recessed parts 48a constitute knee grip parts which are held between the knees of a driver while driving. The knee grip parts 48a cover, from the outer lateral sides, the lower areas of the central part to the rear part of the fuel tank 42 shown in FIG. 1.

Each knee grip part 48a is arranged forward with respect to a line connecting a rider step 49 to the front end of the seat 44 and on a side wall lower part of the fuel tank 42. The knee grip parts 48a are, for example, located above the engine E. In the present embodiment, the knee grip parts 48a are formed in areas above the driving motor M and the cylinder head 24. The knee grip parts 48a may be formed in areas from the boundary between the seat 44 and the fuel tank 42 to the middle position of the fuel tank 42 in the front-to-rear direction.

As shown in FIG. 1, a rear fender 50 is disposed below the rear cowl 47 and above the rear wheel 16. The rear fender 50 include walls to prevent entry of mud, water, and the like splashed by the rear wheel 16 into the vehicle body. The rear fender 50 includes side walls and a bottom wall. In other words, the rear fender 50 has a U-shaped cross section perpendicular to the front-to-rear direction. The rear fender 50 is made of, for example, a resin. The rear fender 50 includes a housing space S (FIG. 6) therein, and a battery 52 is housed in the housing space S. That is, the rear fender 50 constitutes a battery case for housing the battery 52.

The housing space S in which the battery 52 is housed is located below the rider's seat 44. The housing space S is arranged rearward of the engine E. The housing space S is arranged between the left and right rear frame portions 2, 2. Specifically, a rear part of the housing space S is located rearward of the rear end of the rider's seat 44. The front end of the housing space S is arranged forward of the front end of the rear wheel 16 and rearward of the pivot shaft 13. The housing space S is arranged below the lower surface of the fuel tank 42.

Output of the generator 26 (FIG. 2) is supplied to the battery 52 to charge the battery 52. The power stored in the battery 52 is supplied to the ISG motor M (Integrated Starter Generator Motor), which also serves as the generator 26 as described above, to drive the ISG motor M. The battery 52 can output large current to provide output required for driving. The present embodiment employs a structure for suppressing temperature rise in the battery 52 in order to demonstrate performance of the battery 52. Specifically, the present embodiment employs a structure for guiding the incoming wind to the battery 52. The battery 52 of the present embodiment is a 48-V lithium-ion battery. However, the battery 52 is not limited to this.

Figure 4:
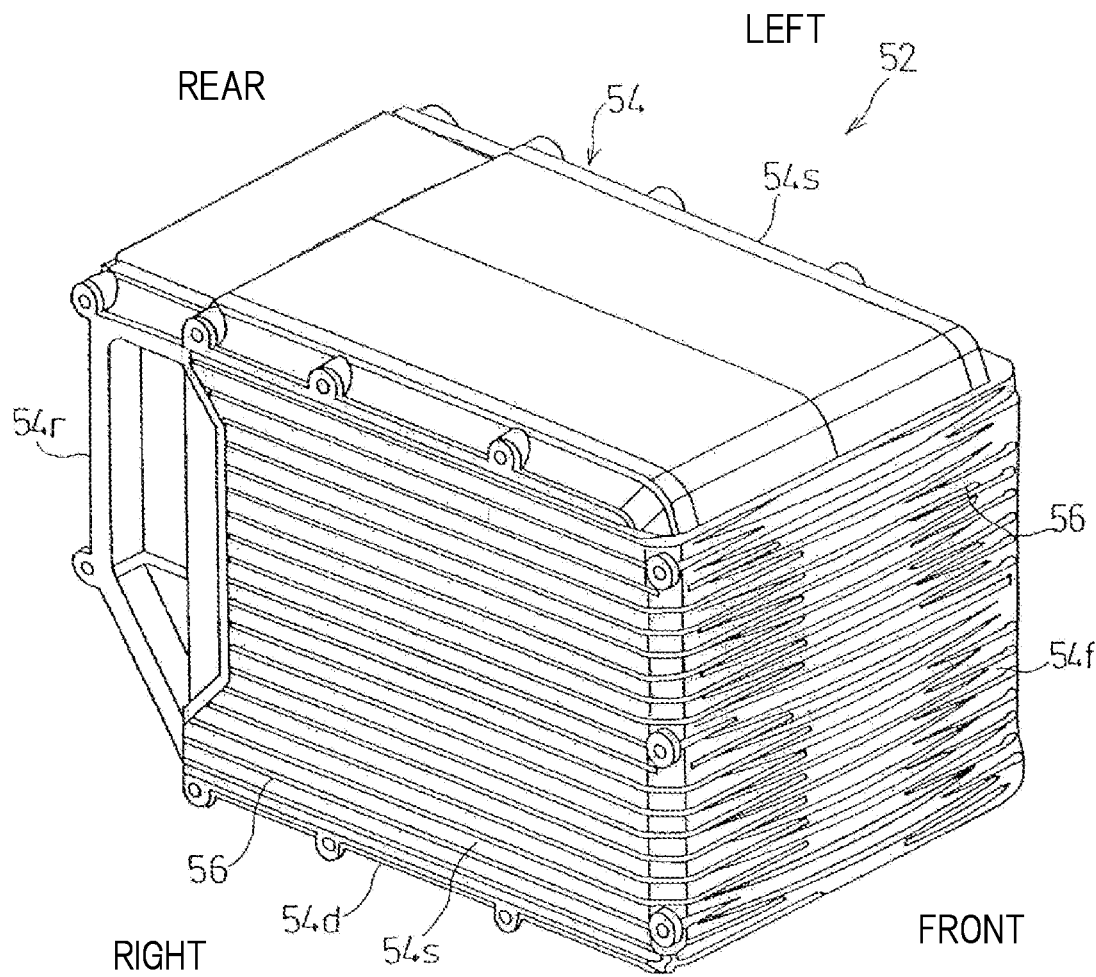
FIG. 4 is a perspective view of a battery of the motorcycle.

As shown in FIG. 4, the battery 52 of the present embodiment includes a box-shaped enclosure 54 and a plurality of cells housed inside the enclosure 54. The enclosure 54 is made of a metal, e.g., an aluminum alloy. However, the material of the enclosure 54 is not limited to a metal.

The enclosure 54 includes cooling fins 56 on the outer surface of the enclosure 54. The cooling fins 56 are protrusions for increasing the surface area to enhance heat exchange efficiency. In the present embodiment, the enclosure 54 includes cooling fins 56 on the opposite side surfaces 54s, 54s, the front surface 54f and the rear surface 54r of the enclosure. The cooling fins 56 on the opposite side surfaces 54s, 54s extend in the front-to-rear direction. The cooling fins 56 on the front surface and the rear surface extend in the vehicle widthwise direction (left-to-right direction).

Figure 3:
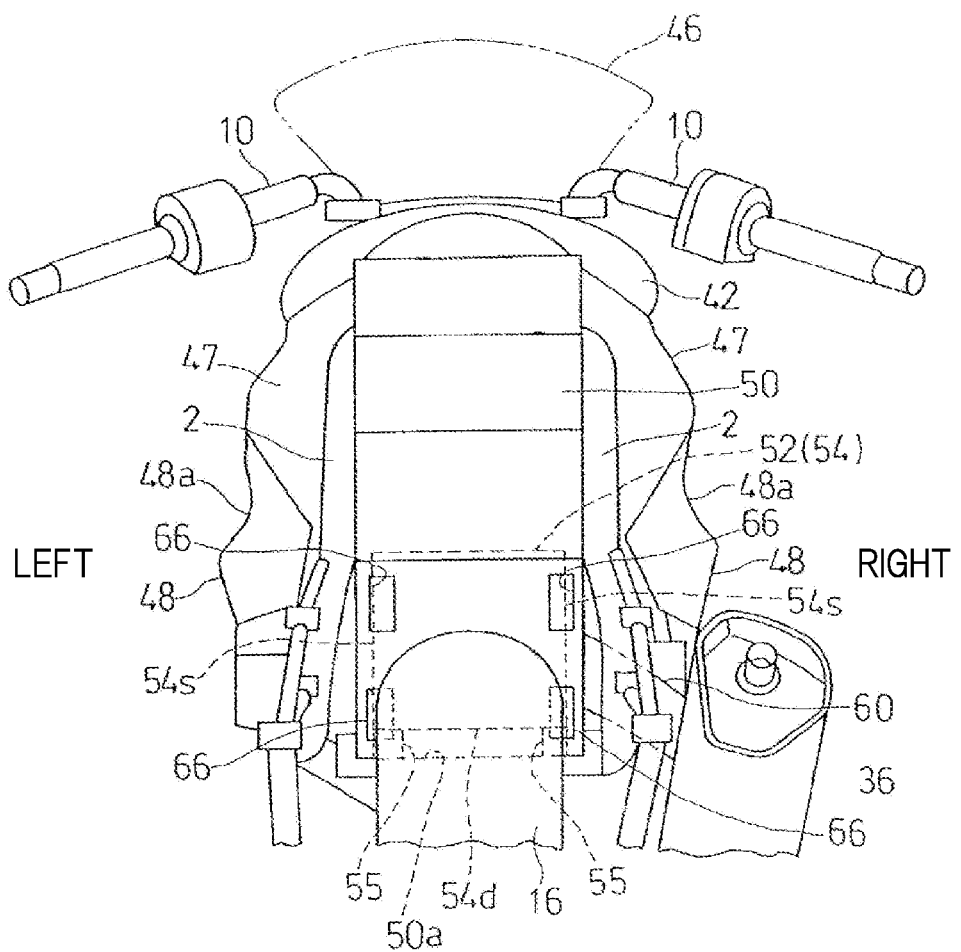
FIG. 3 is a rear view of the motorcycle.

As shown in FIG. 3, the battery 52 is raised by left and right rubber pieces 55, such that a space for air flow is defined between the lower surface 54d of the enclosure 54 and the upper surface 50a of the rear fender 50. Therefore, the cooling fins 56 may be provided on the lower surface 54d of the enclosure 54. If a space for air flow can be obtained above the enclosure 54, the cooling fins 56 may be provided on the upper surface of the enclosure 54.

As shown in FIG. 1, the motorcycle of the present embodiment includes a duct 60 for guiding the incoming wind to the battery 52. The duct 60 is made of, for example, a resin. However, the material of the duct 60 is not limited to a resin. The duct 60 may be constituted by a single member or be assembled from a plurality of members.

In the present embodiment, the duct 60 is disposed offset from the center of the vehicle body in the vehicle widthwise direction on an outer side of the vehicle body in the vehicle widthwise direction. In the present embodiment, the duct 60 is disposed on the right side of the vehicle body. In the present embodiment, the duct 60 is provided only on an outer lateral part on the right side of the vehicle body. However, as shown with double dotted lines in FIG. 2, another duct 60 may additionally be provided on the left side of the vehicle body. Where the ducts 60 are provided on both sides of the vehicle body in the vehicle widthwise direction, the incoming wind can be easily supplied to the left side surface and the right side surface of the battery 52 equally.

The inlet of the duct 60 is arranged forward of the front end of the engine. The outlet of the duct 60 communicates to an area in front of the housing space S of the battery case 50. In other words, the duct 60 extends in the front-to-rear direction from the front of the engine E to the rear of the engine E. In a side view of the vehicle body, the duct 60 overlaps the engine E in some area where the duct 60 is located on an outer side in the vehicle widthwise direction with respect to the outer surface of the engine E in the vehicle widthwise direction. The duct 60 extends in the front-to-rear direction to pass the area where the duct overlaps the cylinder 23 of the engine E in a side view of the vehicle body and then passes above the upper surface of the crankcase 22. The duct 60 passes between the motor M and the swing arm 12 to extend inward of the frame in a curved manner. The outlet of the duct 60 is located between the battery 52 and the front end of the battery case 50 in the front-to-rear direction and opens to the rear.

Provision of the duct 60 on one side of the vehicle body in the vehicle widthwise direction as in the present embodiment can achieve a lower manufacturing cost and a fewer number of assembly steps. Where the duct 60 is provided on one side of the vehicle body in the vehicle widthwise direction, the duct 60 may be arranged on the right side of the vehicle body as in the present embodiment or on the left side of the vehicle body as illustrated with double dotted lines. Since the center of the engine E in the vehicle widthwise direction is slightly offset to the left side with respect to the center of the vehicle body in the vehicle widthwise direction, the dimension of the vehicle body in the vehicle widthwise direction can be more easily suppressed if the duct 60 is disposed on the right side of the vehicle body. On the other hand, since the exhaust muffler 36 is disposed on the right side of the vehicle body, influence of heat from the exhaust muffler 36 and the exhaust pipe 34 on the duct 60 can be more easily suppressed if the duct 60 is disposed on the left side of the vehicle body.

If it is possible to avoid interference with other components, the duct 60 may be disposed on the center line of the vehicle body extending in the front-to-rear direction. Specifically, the duct 60 may be arranged in such a way that the duct 60 has the inlet located at the front end of the cowling 46 shown in FIG. 1, extends above the engine E and the motor M, and has the outlet opening to the inner space of the rear fender 50. In this case, the duct 60 is not curved in the vehicle widthwise direction, so that the air smoothly flows through the duct 60 and can be guided to the left and right sides of the battery 52 equally. Further, entry of water can be avoided thanks to the high position of the inlet.

Where the duct 60 is provided on the outer side of the vehicle body as in the present embodiment, it is preferable to arrange the duct 60 on the outer side as far as possible in terms of air intake. However, if the duct 60 is arranged too outward, the dimension of the vehicle increases. In the present embodiment, as shown in FIG. 2, the outer end of the duct 60 in the vehicle widthwise direction is located on the inner side with respect to the outermost end component of the vehicle in the vehicle widthwise direction. Thus, the duct 60 can avoid contact with the ground when the vehicle body banks. The duct 60 has a flat shape with a larger dimension in the vertical direction than in a dimension in the vehicle widthwise direction. This can increase the amount of the incoming wind while preventing size increase in the vehicle widthwise direction.

In addition, the duct 60 is disposed below the knee grip part 48a. For example, in a side view of the vehicle body, the duct 60 is shaped so as to curve inward of the vehicle body, starting from a frontal position with respect to a triangular area connecting the front end of the seat 44, the rear end of the seat 44 and the step 49. More specifically, the duct 60 is disposed on the inner side in the vehicle widthwise direction with respect to a frame portion vertically extending from an area near the front end of the seat 44 toward the swing arm 12.

As shown in FIG. 1, with respect to the vertical direction, the duct 60 extends rearward between the clutch cover 30 and the cylinder head 24. In particular, the duct 60 extends rearward between the outer end of the clutch cover 30 in the vehicle widthwise direction and the outer end of the cylinder 23 in the vehicle widthwise direction. In other words, the duct 60 extends on the outer side in the vehicle widthwise direction with respect to the outer surface of the cylinder 23 in the vehicle widthwise direction, on the inner side in the vehicle widthwise direction with respect to the outer surface of the clutch cover 30 in the vehicle widthwise direction, and above the upper surface of the clutch cover 30.

In the present embodiment, the inlet 62 at the front end portion of the duct 60 is located forward of the engine E in a side view. The inlet 62 of the duct 60, however, may be located at a position where the inlet 62 overlaps the engine E in a side view. The inlet 62 of the duct 60 is located below the radiator 40. This makes it possible to prevent the duct 60 from interfering with the flow of the incoming wind toward the radiator 40.

The inlet 62 of the duct 60, i.e., the front end portion of the duct 60 has a funnel shape. Further, the outlet 64 of the duct 60 may have a rapidly decreasing dimension in the vertical direction, as compared with the dimension of the rest part of the nozzle, in order to increase the flow speed of the incoming wind blowing toward the battery 52. That is, the opening area of the inlet 62 is larger than the passage area rearward of the inlet. Thus, the larger opening area of the inlet 62 can increase the amount of air to be taken in from the inlet 62.

The inlet 62 extends in a forwardly inclined manner from its upper end to its lower end. In other words, the lower front end of the inlet 62 is located forward of the upper front end of the inlet 62. Thus, the orientation of the duct inlet 62 can be set off from the tangential direction of the front wheel 8 so as to prevent entry of water splashing from the road surface into the inlet 62.

As shown in FIG. 2, at least a part of the inlet 62 of the duct 60 is located on the outer side in the vehicle widthwise direction with respect to the front wheel 8 in a front view. In the present embodiment, the whole inlet 62 of the duct 60 is located on the outer side in the vehicle widthwise direction with respect to the front wheel 8 in a front view. Thus, it is possible to suppress entry of mud, water, and the like splashed by the front wheel 8 from the inlet 62. A drain hole may be provided to the duct 60.

Figure 5:
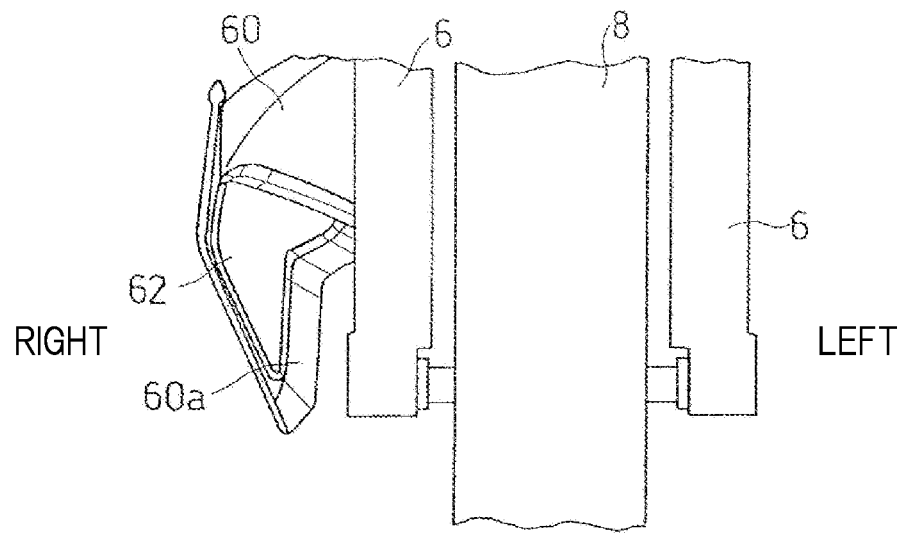
FIG. 5 is an enlarged front view of a front part of the motorcycle.

FIG. 5 is an enlarged view of the duct 60. As shown in this figure, the inlet 62 of the duct 60 has a decreasing dimension in the vehicle widthwise direction from the upper end to the lower end in a front view. This makes it possible to secure the intake amount of the incoming wind while preventing the outer side surface of the duct 60 from interfering with the ground when the vehicle body banks.

In particular, separate from the duct 60, a guide cover 60a is provided to the front end of the duct 60. The guide cover 60a has a funnel shape that flares in the vehicle widthwise direction toward the front. In a front view of the vehicle body, the inner surface of the guide cover 60a in the vehicle widthwise direction is located on the inner side in the vehicle widthwise direction with respect to the inner surface of the duct 60 in the vehicle widthwise direction. This can increase the amount of the incoming wind while preventing increase in the size of the vehicle body in the vehicle widthwise direction.

The outlet 64 at the rear end portion of the duct 60 shown in FIG. 1 opens to the housing space S of the rear fender 50. In particular, the outlet 64 opens to the front of the battery 52 inside the rear fender 50. In the present embodiment, the opening area of the inlet 62 of the duct 60 is larger than the opening area of the outlet 64 of the duct 60. In particular, the opening area of the duct 60 decreases from the inlet 62 to the outlet 64. By increasing the opening area of the inlet 62, the amount of air to be taken into the duct 60 can be increased. In addition, since the outlet 64 has the smaller opening area, the flow speed increases while the air flows through the duct 60. Increased flow speed can facilitate the air flow along the cooling fins 56 of the battery 52 to increase the cooling efficiency.

As shown in FIG. 3, discharge holes 66 are defined in a rear part of the rear fender 50 with respect to the battery 52. The discharge holes 66 discharge the incoming wind supplied to the inside of the rear fender 50 through the duct 60 toward the rear. In the present embodiment, the discharge holes 66 are located at four points, namely, the upper right part, lower right part, upper left part and lower left part of the rear wall of the rear fender 50. In particular, a pair of discharge holes 66 are defined in either side so as to face the gap between the battery 52 and the battery case 50 in the vehicle widthwise direction. Part of the discharge holes 66 are located on the outer sides in the vehicle widthwise direction with respect to the outer ends of the rear wheel 16 in the vehicle widthwise direction in a rear view. However, the number and arrangement of the discharge hole 66 are not limited to those of this example.

Figure 6:
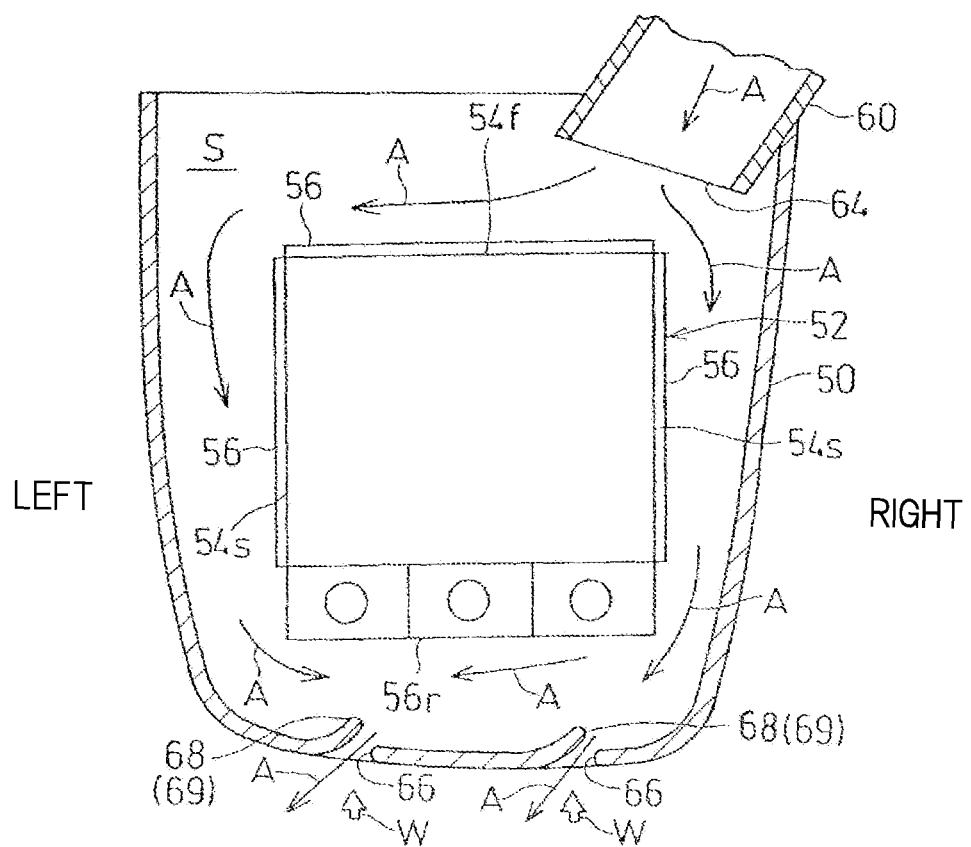
FIG. 6 is a horizontal sectional view of a rear fender of the motorcycle.

As shown in FIG. 6, each discharge hole 66 has a louver structure 69. In particular, ribs 68 are formed on the rear wall of the rear fender 50. Each of the ribs 68 extends in a forwardly inclined manner from the edge part of the discharge hole 66 toward the discharge hole 66. That is, each rib 68 extends so as to close the discharge hole 66 in a rear view. This makes it possible to prevent rainwater spattered from the rear wheel 16 and/or washing water W during washing from directly heading to the battery 52. That is, the ribs 68 constitute baffles which prevent entry of foreign objects through the discharge holes 66. As long as the louver structures 69 can prevent high-pressure fluid W from directly coming to the battery 52, the louver structures are not limited to those having the shape of the present embodiment.

The effects of the present embodiment are described. When the motorcycle shown in FIG. 1 travels, the incoming wind A is taken into the duct 60 from the inlet 62. The incoming wind A taken into the duct 60 flows through the duct 60 and is introduced to the inside of the rear fender 50 from the outlet 64. The incoming wind A introduced to the inside of the rear fender 50 cools the battery 52 and then is discharged to the outside from the discharge holes 66.

In particular, as shown in FIG. 6, a part of the incoming wind A introduced to the inside of the rear fender 50 from the outlet 64 of the duct 60 flows in the vehicle widthwise direction along the front surface 54f of the battery 52 and then in the front-to-rear direction along the left side surface 54s of the battery 52 and flows around to the rear surface 54r of the battery 52 before it is discharged from the discharge holes 66. Another part of the incoming wind A flows in the front-to-rear direction along the right side 54s of the battery 52 and flows around to the rear surface 54r of the battery 52 before it is discharged from the discharge holes 66.

Further, another part of the incoming wind A flows in the front-to-rear direction along the lower surface 54d of the battery 52 shown in FIG. 3 and flows around to the rear surface 54r of the battery 52 shown in FIG. 6 before it is discharged from the discharge holes 66. Thus, in the present embodiment, the incoming wind A flows along the front surface 54f, the opposite side surfaces 54s, 54s, the lower surface 54d and the rear surface 54r of the battery 52. Since the cooling fins 56 are provided on the front surface 54f, the side surfaces 54s and the rear surface 54r, the incoming wind A flows along the cooling fins 56. This makes it possible to effectively cool the battery 52 disposed in the rear part of the vehicle body by the incoming wind A.

Lithium-ion batteries generate heat during discharging. When the cell temperature reaches the upper limit temperature, discharging is stopped for the purpose of battery protection. In the present embodiment, the battery 52 can be effectively cooled by the incoming wind A, so that the temperature rises in the battery 52 can be suppressed. This makes it possible to prevent the battery 52 from reaching the upper limit temperature and thereby extend the discharge period. In addition, in a hybrid vehicle as in the present embodiment, heat is generated during switching between driving using the engine E and driving using the motor M shown in FIG. 1. In particular, heat is generated during driving when a large amount of current is discharged. Therefore, cooling of the battery 52 is required especially during driving. For this reason, in the present embodiment, the incoming wind A is used to cool the battery 52, so that effective cooling of the battery 52 can be realized with a simple structure.

As shown in FIG. 2, the inlet 62 of the duct 60 is located on the outer side in the vehicle widthwise direction with respect to the front wheel 8 in a front view. This makes it possible to take the incoming wind A into the duct 60 while suppressing influence of the front wheel 8. This makes it possible to increase the amount of the incoming wind A to be taken into the duct 60. In addition, this also makes it possible to prevent entry of mud, water, and the like splashed by the front wheel 8 into the duct 60.

As shown in FIG. 1, the inlet 62 of the duct 60 is located forward of the engine E in a side view. This makes it possible to take the incoming wind A into the duct 60 before the incoming wind A comes into contact with the engine E. As a result, a greater amount of the incoming wind A can be taken into the duct 60.

As shown in FIG. 5, the inlet 62 of the duct 60 may have a decreasing dimension in the vehicle widthwise direction from the upper end to the lower end in a front view. This makes it possible to provide a larger opening area of the inlet 62 to secure the intake amount of the incoming wind A while preventing the outer side surface of the duct 60 from interfering with the ground when the vehicle body banks.

As shown in FIG. 6, each discharge hole 66 has a louver structure 69. This makes it possible to prevent rainwater and/or washing water W from directly heading to the battery 52 through the discharge holes 66. Thus, it is possible to secure the flow of the incoming wind A and to protect the battery 52 from contact with rainwater and/or washing water W.

As shown in FIG. 2, the duct 60 is disposed on the outer side of the vehicle body in the vehicle widthwise direction, and the duct 60 is disposed below the knee grip part 48a. This makes it possible to avoid interference of the duct 60 with a leg of a driver.

As shown in FIG. 1, with respect to the vertical direction, the duct 60 extends rearward in an area between the clutch cover 30 and the cylinder head 24. In this area, the outer end of the duct 60 in the vehicle widthwise direction is located on the inner side in the vehicle widthwise direction with respect to the outer end of the cover body 30 in the vehicle widthwise direction. Thus, it is possible to suppress increase in the dimension of the vehicle body in the vehicle widthwise direction due to the duct 60. The duct 60 may be located above the cylinder 23 and be arranged so as to extend laterally outside of the cylinder head 24.

The opening area of the inlet 62 of the duct 60 is larger than the opening area of the outlet 64 of the duct 60. Thus, the speed of the incoming wind A flowing in the duct 60 is increased. As a result, the incoming wind A flows swiftly along the cooling fins 56 (FIG. 4) of the battery 52, enhancing the cooling efficiency.

Since the duct 60 is disposed on the inner side in the vehicle widthwise direction with respect to the cover body 30, the cover body 30 tends to collide with the road surface before the duct 60 collides with the road surface when the vehicle falls over, so that breakage of the duct 60 can be prevented.

The battery 52 is disposed with a gap between the lower surface of the battery 52 and the upper surface of the rear fender 50 in the vertical direction. This makes it possible to prevent attachment of waterdrops to the battery 52 even in the case of dew condensation and/or entry of water during rainfall or washing into the housing space S. The housing space S may be provided with drain holes. Thus, rainwater entering the housing space S can be discharged outside the housing space S.

In the present embodiment, the incoming wind A passes along the front-to-rear direction in which the cooling fins 56 extend, so that a larger amount of the incoming wind A can come into contact with the cooling fins 56 and turbulence of the incoming wind A can be suppressed to reduce resistance in the flow path.

In the present embodiment, the housing space S is arranged in a position lower than the fuel tank 42. Thus, since the housing space S is arranged in a lower place, the distance in the vertical direction between the battery 52 and the inlet 62 of the duct 60 can be reduced, so that the duct 60 can be shortened. In addition, since the outlet 64 of the duct 60 faces the area between the battery 52 and the battery case 52, the incoming wind A can be smoothly guided to the cooling fins 56.

In the present disclosure, as discussed above, at least a part of the inlet 62 at the front end portion of the duct 60 may be located on the outer side in the vehicle widthwise direction with respect to the front wheel 8 in a front view. According to this configuration, the incoming wind A flowing rearward without colliding with the front wheel 8 can be taken into the duct 60. Thus, a greater amount of the incoming wind A can be taken into the duct 60. This also makes it possible to suppress entry of mud, water, and the like splashed by the front wheel 8 into the duct 60.

The inlet 62 of the duct 60 may be located forward of the engine E in a side view. According to this configuration, the incoming wind A can be taken into the duct 60 before the incoming wind A comes into contact with the engine E. This makes it possible to increase the intake amount of the incoming wind A into the duct 60 and to suppress influence of heat from the engine E.

An inlet 62 at a front end portion of the duct 60 may have an increasing dimension in a vehicle widthwise direction from a lower end of the inlet 62 to an upper end of the inlet in a front view. According to this configuration, protrusion of the lower end portion of the duct 60 to the outer side in the vehicle widthwise direction can be reduced. This makes it possible to secure the intake amount of the incoming wind A while preventing the duct 60 from interfering with the ground when the vehicle body banks.

The rear fender 50 may include a baffle 75 which prevents entry of foreign objects through the discharge hole 66. According to this configuration, it is possible to prevent rainwater and/or washing water from directly heading to the battery 52 through the discharge hole 66. Thus, it is possible to secure the flow of the incoming wind A while driving and to protect the battery 52 from influence of fluid.

The duct 60 may be disposed on an outer side of a vehicle body in a vehicle widthwise direction, and the duct 60 may be disposed below a knee grip part 48a on a lateral side of the vehicle body. According to this configuration, interference of the duct 60 with a leg of a driver can be prevented.

The saddle riding vehicle may further include an engine E which is a driving power source disposed in front of the battery 52 and between a front wheel 8 and the rear wheel 16, and a cover body 30 which protrudes from the engine E toward one side in a vehicle widthwise direction and covers an end face of a crankshaft 20 disposed in a lower part of the engine E from an outer side in the vehicle widthwise direction, wherein a part of the duct 60 extends rearward between an outer end of the cover body 30 in the vehicle widthwise direction and an outer end of the engine E in the vehicle widthwise direction. According to this configuration, it is possible to suppress increase in the dimension of the vehicle body in the vehicle widthwise direction due to the duct 60.

An opening area of a front end portion of the duct 60 may be larger than an opening area of a part of the duct 60 facing the battery 52. According to this configuration, the speed of the incoming wind A flowing in the duct 60 is increased. As a result, the incoming wind A flows readily along the battery 52 at high speed, so that the cooling efficiency is enhanced.

In the present embodiment, the rear surface of the battery case 50 functions as a vehicle body outer surface of the vehicle body which faces the rear. Therefore, the air discharged from the discharge port defined in the battery case 50 is discharged outside of the vehicle body. The battery case 50 is a member which defines the housing space for receiving the battery 52. Thus, the battery case 50 may be constructed as a battery case including a battery case main body for mainly housing the battery 52 and a plurality of members arranged around the battery case main body to define a battery housing space.

FIG. 7 to FIG. 11 show a second embodiment of the present disclosure. In the following description of the second embodiment, the same reference signs are used to denote the same features as those of the first embodiment, and the detailed description thereof is omitted.

In the first embodiment described above, the discharge holes 66 are arranged in the rear surface of the battery case main body. In the second embodiment, the discharge holes 66A are arranged at the rear of the battery case 50. Specifically, the battery case 50 includes the battery case main body 51, a rear fender rear 55, and rear covers 70. The discharge holes 66A are arranged in the rear ends of the rear covers 70 which constitute a part of the battery case 50. The discharge holes 66A defined in the rear covers 70 are arranged with gaps at the rear from the rear surface of the battery 52. In the present embodiment, the discharge holes 66A are located above the rear wheel 16 and rearward of the upper end portion of the rear wheel 16. The discharge holes 66A are located above the upper end of the battery 52. This is described in more detail below.

Figure 7:
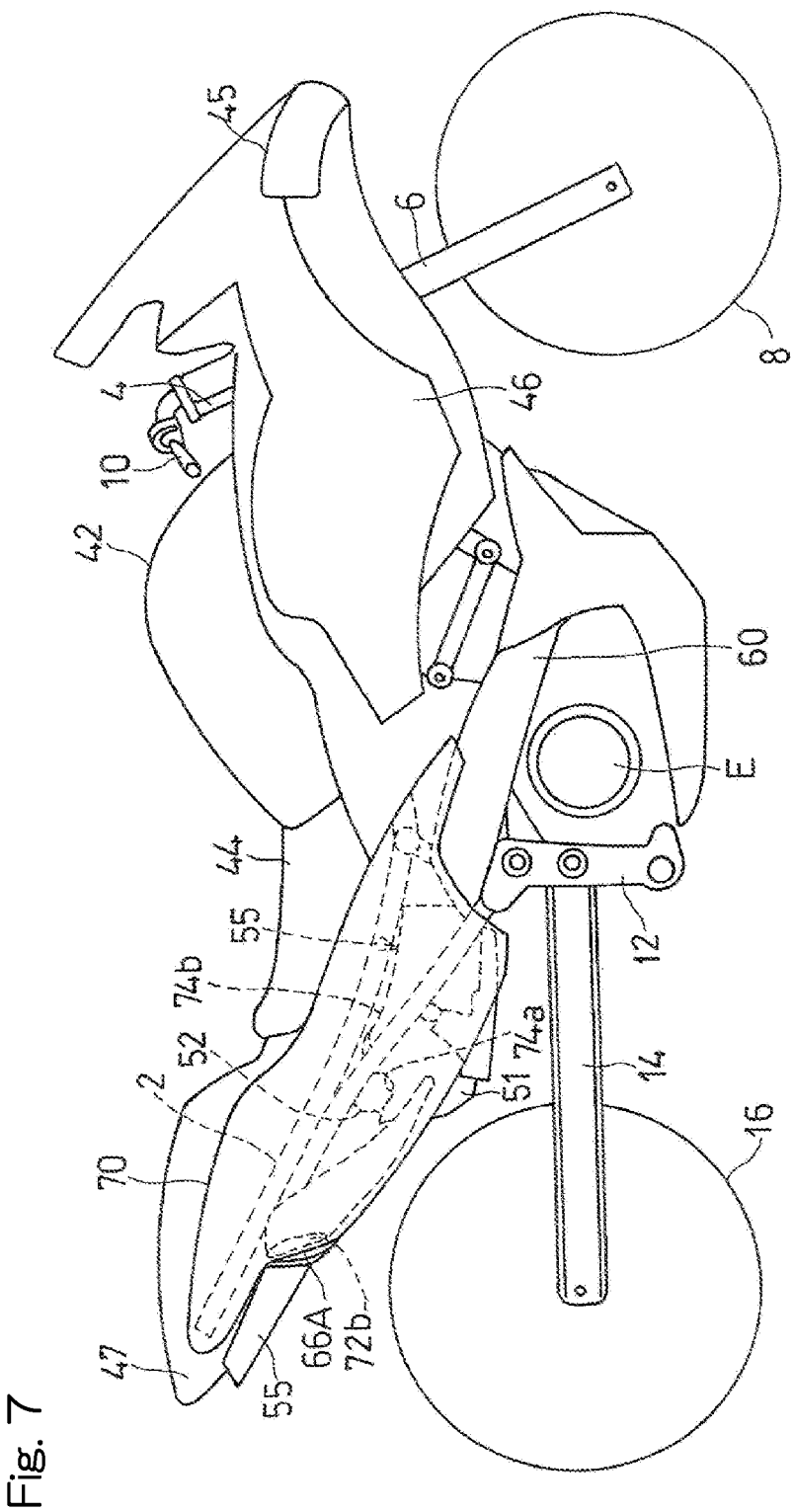
FIG. 7 is a side view showing a motorcycle that is a type of saddle riding vehicle according to a second embodiment of the present disclosure.

As shown in FIG. 7, in the second embodiment, a pair of left and right rear covers 70 which cover the rear part of the vehicle body from the outer sides in the vehicle widthwise direction are attached to the rear part of the vehicle body. The rear covers 70 cover the rear frame 2 which supports the seat 44 from the outer sides in the vehicle widthwise direction. In the present embodiment, starting from an area below the seat 44, the rear covers 70 cover the rear fender front 51, the rear fender rear 55 and a part of the rear cowl 47 from the laterally outer sides. That is, the rear covers 70 constitute covers which cover at least a part of the rear surface of the rear fender front 51 which is the battery case main body. As described above, the discharge holes 66A are located at the rear ends of the rear covers 70. The rear fender rear 55 is disposed rearward of the rear fender front 51 and covers the rear frame 2 from below. The rear end faces of the rear covers 70 are located behind and above the battery 52. The rear end walls of the rear covers 70 function as outer shells which partition a vehicle body rear space and a vehicle body inner space.

Figure 8:
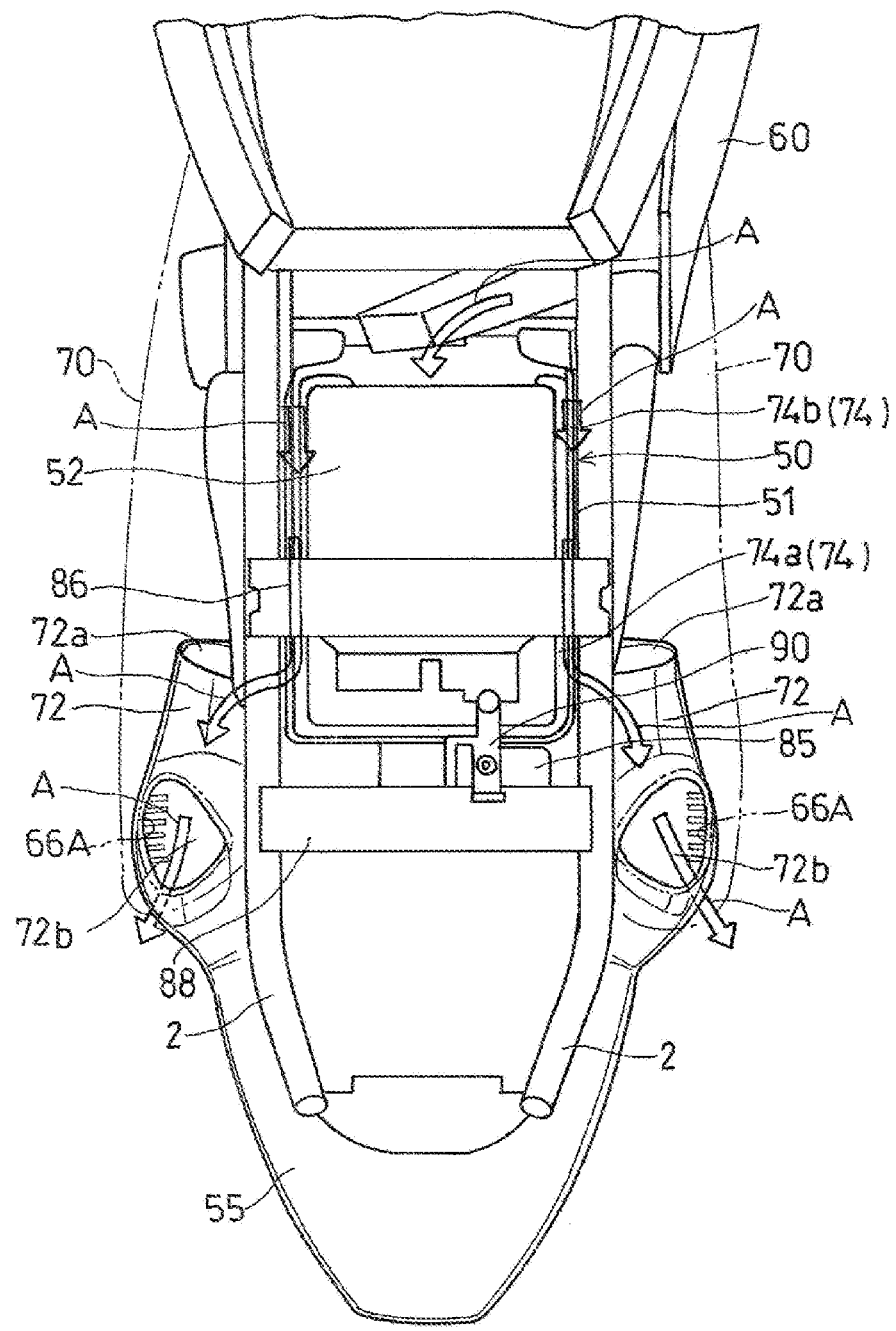
FIG. 8 is a plan view showing the state of a rear part of the motorcycle with a seat and a rear cowl removed.

As shown in FIG. 8, the rear end of the duct 60 faces, i.e., is opposite to the front end of the rear fender front 51 in the front-to-rear direction, and the rear end of the duct 60 and the front end of the rear fender front 51 are covered by the rear covers 70 from the outer sides in the vehicle widthwise direction. Thus, the incoming wind from the rear end of the duct 60 is guided to the inner surfaces of the rear covers 70 to be introduced into the inner space of the rear fender front 51.

The rear fender front 51 and the rear fender rear 55 constitute walls that partition the vehicle body and the lower space. The rear fender front 51 provides covering for the major part of the battery 52, and the rear fender rear 55 provides covering for the rear part of the battery 52. The rear part of the rear fender front 51 and the front part of the rear fender rear 55 are arranged in an overlapping manner in the front-to-rear direction.

Further, the rear part of the rear fender front 51 faces inlets 72a of air passages 72 defined inside the rear fender rear 55. The inlets 72a are opposite to the rear surface of the battery 52 and the rear side surfaces of the battery 52. The rear fender front 51 is covered by the rear covers 70 from the outer sides in the vehicle widthwise direction with gaps in the vehicle widthwise direction therebetween. The rear fender rear 55 is covered by the rear covers 70 from the outer sides in the vehicle widthwise direction. In particular, the inlets 72a of the rear fender rear 55 are located on the outer sides in the vehicle widthwise direction with respect to the rear part of the rear fender front 51 and at the rear end of the rear part of the rear fender front 51.

As shown in FIG. 7, the side walls 74a of the rear part of the rear fender front 51 are lower in height than the side walls 74b of the rest part of the rear fender front 51. The areas where the side walls 74a are lower in height in the rear part of the rear fender front 51 face the inlets 72a of the air passages 72 of the rear fender rear 55. Thus, as shown in FIG. 8, the incoming wind A from the rear part of the rear fender front 51 is introduced into the air passages 72 inside the rear fender rear 55. The rear surface of the rear fender rear 55 is covered by the rear covers 70, and the outlets 72b of the rear fender rear 55 are placed opposite to the discharge holes 66A of the rear covers 70.

Figure 9:
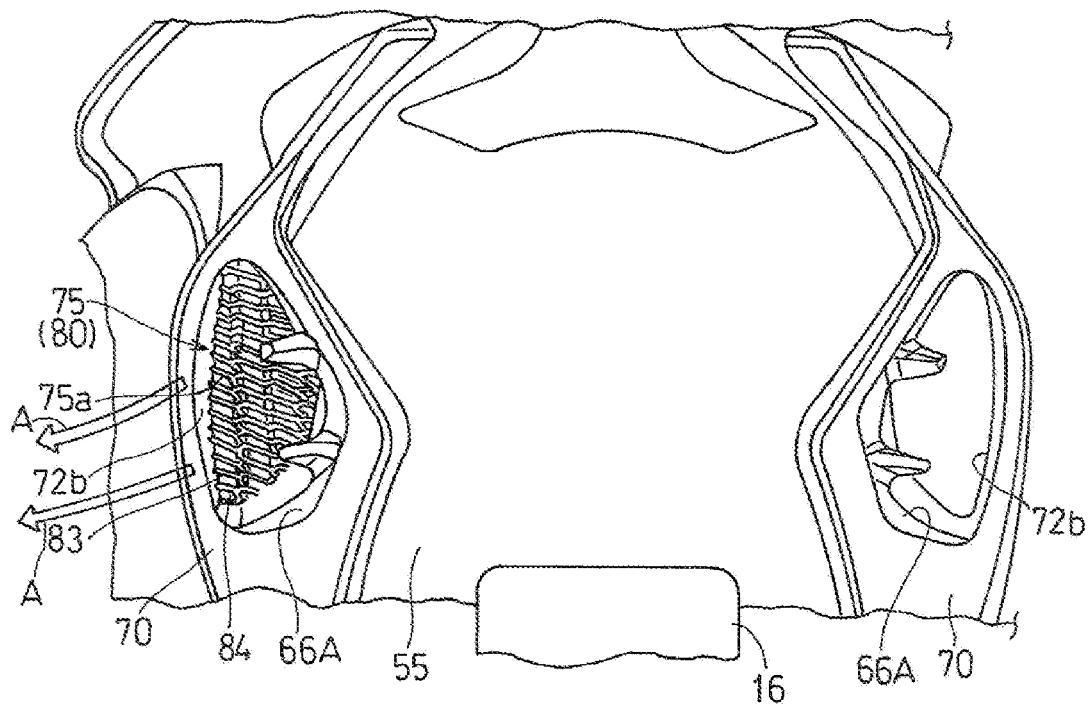
FIG. 9 is a rear view showing the rear part of the motorcycle.

In the present embodiment, the air passages 72 in the rear fender rear 55 are located on the left and right sides with respect to the rear fender front 51. However, the rear fender rear 55 may have the air passage 72 only one of the left and right sides with respect to the rear fender front 51. The respective outlets 72b of the air passages 72 communicate with the discharge holes 66A at the rear ends of the rear covers 70. That is, in the present embodiment, the discharge holes 66A are also located on the left and right sides with respect to the rear fender front 51. In particular, as shown in FIG. 9, the left and right discharge holes 66A are located on the outer sides in the vehicle widthwise direction with gaps in the vehicle widthwise direction from the rear wheel 16. This makes it possible to avoid mud, water, and the like splashed by the rear wheel 16 from heading toward the discharge holes 66A.

As described above, the rear covers 70 of the present embodiment cover the rear end of the duct 60 and the front end of the rear fender front 51 from the outer sides in the vehicle widthwise direction, extend rearward therefrom to cover the rear part of the rear fender front 51 and the inlets 72a of the air passages 72 of the rear fender rear 55 from the outer sides in the vehicle widthwise direction, and further extend rearward beyond the outlets 72b of the air passages 72 of the rear fender rear 55.

In the second embodiment, as with the first embodiment, baffles 75 are provided to prevent entry of foreign objects through the discharge holes 66A as shown in FIG. 9. The baffles 75 are provided to both of the left and right discharge holes 66A. FIG. 9 shows the baffle 75 only for the discharge hole 66A on the left side, and illustration of the baffle on the right side is omitted. Each of the baffles 75 of the second embodiment has a louver structure 80 which blocks flow in the direction from the discharge hole 66A to the battery 52. In the present embodiment, the louver structure 80 is provided to the rear fender rear 55. In particular, the louver structures 80 are provided at the outlets 72b of the air passages 72 of the rear fender rear 55. However, the arrangement of the baffles 75 is not limited to this example, and they may be provided to the rear covers 70 or the rear fender front 51. The baffles 75 may be separate from the covers or the fender members.

Figure 10:
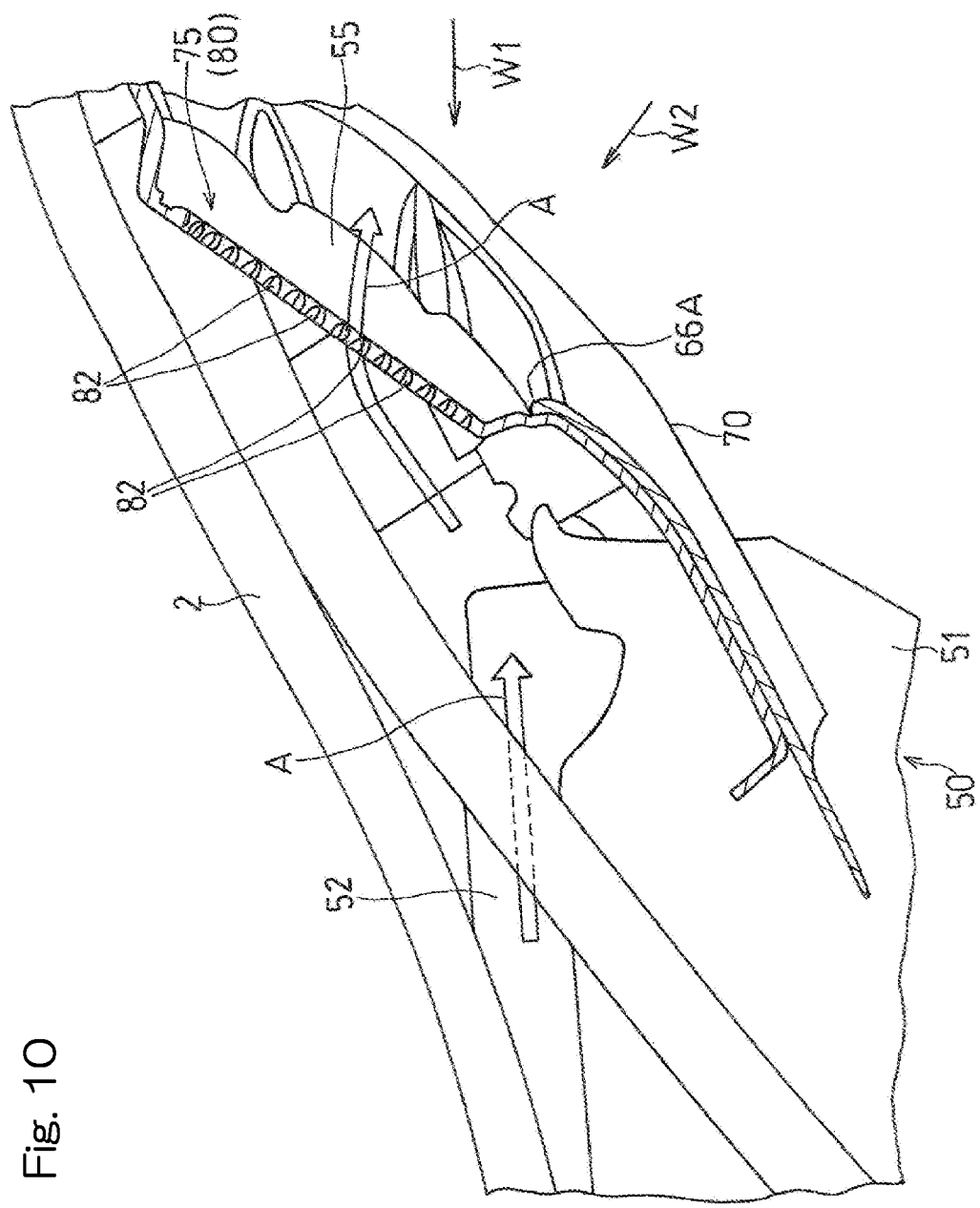
FIG. 10 is a vertical sectional view showing the rear part of the motorcycle.

As shown in FIG. 10, each louver structure 80 includes a plurality of louvers 82 arranged at the outlet 72b of the air passage 72 of the rear fender rear 55. Each louver 82 does not permit passage of the washing water W1 directly heading to the battery 52 but permits passage of the washing water W2 not heading to the battery 52. In general, the battery 52 which is a lithium-ion battery can endure immersion but cannot endure exposure to high-pressure washing water. The louver structures protect the battery 52 from high-pressure washing water.

Each louver structure 80 includes plate parts 83 arranged next to one another in the vertical direction or in the left-to-right direction, each plate part 83 having a width extending in the front-to-rear direction. In the present embodiment, a plurality of plate parts 83 are arranged next to one another in the vertical direction. Each louver structure 80 also includes connecting parts 84 that connect the plate parts 83 separated in the vertical direction. The connecting parts 84 are arranged in a row in the vertical direction. A plurality sets of the connecting parts 84 are arranged apart from one another in the left-to-right direction. Thus, in the present embodiment, each louver structure 80 has a lattice structure in which the discharge hole 66A are divided into a plurality of openings.

Specifically, the plate parts 83 of each louver structure 80 extend in a direction intersecting a virtual line extending diagonally inward in the vehicle widthwise direction from the discharge hole 66A toward the front. The virtual line extends in a direction corresponding to a direction from the discharge hole 66A toward the battery 52. In the present embodiment, for example, the plate parts 83 extend parallel to the front-to-rear direction and thus in a direction intersecting the virtual line. The dimension of each plate part 83 in the vehicle widthwise direction and the vertical interval between adjacent plate parts 83 are set in such a way that the discharge hole 66A appears to be closed by the plurality of plate parts 83 when viewed in the direction of virtual line. Even in this case, when the discharge hole 66A is viewed in the front-to-rear direction, the interior of the covers can be viewed through the plurality of openings. This makes it possible to secure discharge of the air while preventing high-pressure water from heading to the battery 52.

As shown in FIG. 8, a control battery 85 is disposed behind the battery 52. The control battery 85 is a low-voltage (e.g., 12-V, 24-V) battery. A first cross member 86 and a second cross member 88 extending in the vehicle widthwise direction are bridged from the left portion to the right portion of the rear frame 2, with the first cross member 86 placed in the front. The control battery 85 is placed between the first cross member 86 and the second cross member 88.

Figure 11:
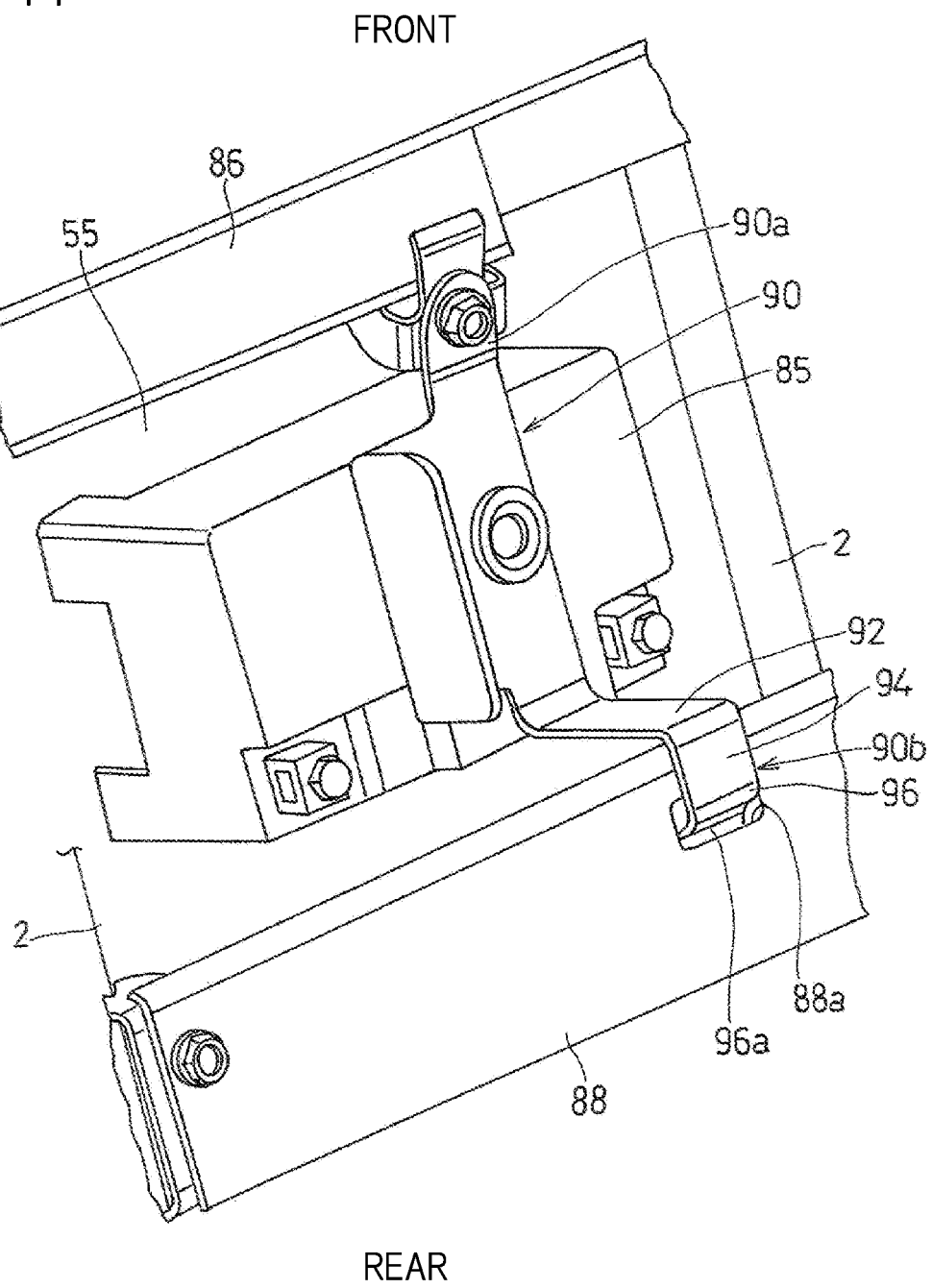
FIG. 11 is a perspective view showing a support structure for a 12-V battery of the motorcycle.

As shown in FIG. 11, the control battery 85 is supported by the first and second cross members 86, 88 through a bracket 90. The bracket 90 is shaped by bending a plate member whose longitudinal direction corresponds to the front-to-rear direction. The front end portion 90a of the bracket 90 is fastened with a bolt to the first cross member 86, and the rear end portion 90b of the bracket 90 is engaged with the second cross member 88. The middle portion of the bracket 90 in the front-to-rear direction is fastened with a bolt to the upper surface of the control battery 85.

In particular, the second cross member 88 includes a rectangular through hole 88a facing in the vertical direction. The bracket 90 includes a raised part 92 directed upward from the vicinity of the rear end portion of the control battery 85, a horizontal part 94 extending rearward from the upper end of the raised part 92, and an engaging part 96 extending downward from the rear end of the horizontal part 94.

The upper end of the raised part 92 is located above the upper surface of the second cross member 88, and the horizontal part 94 extends in the front-to-rear direction above the second cross member 88 from the front edge of the second cross member 88 to the through hole 88a. The engaging part 96 extends through the through hole 88a of the second cross member 88. The engaging part 96 includes, at its lower end portion, an inclined part 96a that is inclined downward to the rear. The inclined part 96a is engaged into the through hole 88a so as to prevent the rear end portion 90b of the bracket 90 from being released upward from the through hole 88a of the second cross member 88. In this way, one end of the bracket 90 is supported on the vehicle body frame FR by the engaging structure, so that the attaching operation is easier than in the case where the opposite ends of the bracket 90 are fastened with bolts.

The second embodiment provides the same effects as those of the first embodiment described above. According to the second embodiment, the air passages are defined by the plurality of parts including the duct 60, the rear fender front 51, the rear fender rear 55 and the rear covers 70. This increases freedom in the arrangement and shape of the air passages including the discharge holes 66A shown in FIG. 10.

A larger opening area of the discharge holes 66A is advantageous in terms of the flow of the incoming wind but disadvantageous in terms of entry of high-pressure water. Therefore, the size of the openings should be determined considering the balance between these. According to the second embodiment, the louver structures 80 are provided in the discharge holes 66A, so that the discharge holes 66A can have a large opening area to secure the flow of the incoming wind, while the high-pressure water can be prevented from heading to the battery 52.

The present disclosure is not limited to the above-described embodiments, and various additions, modifications, or deletions may be made without departing from the scope of the present disclosure. For example, although the above embodiments are described with reference to parallel hybrid vehicles, the present disclosure can also be applied to series hybrid vehicles. The present disclosure can also be applied to electric vehicles which use only an electric motor as a driving source (i.e., so-called EV). The present disclosure can also be applied to vehicles with side cowls and provide the same effects in such cases. Although the above embodiments are described with reference to motorcycles, the present disclosure can also be applied to saddle riding vehicle other than motorcycles, such as three-wheelers and four-wheeled buggies.

The battery 52 may be cooled by a wind supply unit other than the incoming wind A. Specifically, instead of the pressure of the incoming wind, a cooling fan may be used to take air into the battery case and discharge hot air inside the battery case. Cooling may be performed in order to cool, besides the battery 52, electronic components in which large driving current flows and thus generates heat, such as a driving motor, a driving circuit for the driving motor, an ISG motor, and a driving circuit for the ISG motor. The arrangement of the discharge holes 66A is not limited to that in the above embodiments, the discharge holes 66A may be arranged in arbitrary positions. Accordingly, such variants are included within the scope of the present disclosure.

What is claimed is:

1. A saddle riding vehicle comprising:
   a motor which is a driving power source;
   a battery which powers the motor;
   a duct which supplies incoming wind to the battery; and
   a battery case which is disposed above a rear wheel and houses the battery, wherein
   the battery case has a discharge hole defined therein that discharges the incoming wind supplied by the duct, and
   the duct is disposed on an outer side of a vehicle body in a vehicle widthwise direction and below a knee grip part on a lateral side of the vehicle body.

2. The saddle riding vehicle as claimed in claim 1, wherein at least a part of an inlet at a front end portion of the duct is located on the outer side in the vehicle widthwise direction with respect to a front wheel in a front view.

3. The saddle riding vehicle as claimed in claim 1, wherein an inlet at a front end portion of the duct has an increasing dimension in the vehicle widthwise direction from a lower end of the inlet to an upper end of the inlet in a front view.

4. The saddle riding vehicle as claimed in claim 1, further comprising a baffle which prevents entry of foreign objects through the discharge hole.

5. The saddle riding vehicle as claimed in claim 4, wherein the baffle has a louver structure which blocks flow in a direction from the discharge hole to the battery.

6. The saddle riding vehicle as claimed in claim 1, wherein an opening area of a front end portion of the duct is larger than an opening area of a part of the duct facing the battery.

7. The saddle riding vehicle as claimed in claim 1, further comprising a cover which covers at least a part of a rear surface of the battery case.

8. A saddle riding vehicle comprising:
   a motor which is a driving power source;
   a battery which powers the motor;
   a duct which supplies incoming wind to the battery;
   a battery case which is disposed above a rear wheel and houses the battery;
   an engine which is a driving power source disposed in front of the battery and between a front wheel and the rear wheel; and
   a cover body which protrudes from the engine toward one side in a vehicle widthwise direction and covers an end face of a crankshaft disposed in a lower part of the engine from an outer side in the vehicle widthwise direction, wherein
   the battery case has a discharge hole defined therein that discharges the incoming wind supplied by the duct, and
   a part of the duct extends rearward between an outer end of the cover body in the vehicle widthwise direction and an outer end of the engine in the vehicle widthwise direction.

9. The saddle riding vehicle as claimed in claim 8, wherein an inlet of the duct is located forward of the engine in a side view.

10. A saddle riding vehicle comprising:
    a motor which is a driving power source;
    a battery which powers the motor;
    a duct which supplies incoming wind to the battery;
    a discharge hole which is defined at a rear of the battery and discharges the incoming wind supplied by the duct; and
    a louver structure which blocks flow in a direction from the discharge hole to the battery.

* * * * *